(12) United States Patent
Ezrielev et al.

(10) Patent No.: US 12,253,905 B2
(45) Date of Patent: Mar. 18, 2025

(54) SYSTEM AND METHOD FOR REMEDIATING MISALIGNMENT OF A DATA PIPELINE USING ERROR MESSAGES

(71) Applicant: Dell Products L.P., Round Rock, TX (US)

(72) Inventors: Ofir Ezrielev, Beer Sheva (IL); Hanna Yehuda, Acton, MA (US); Kristen Jeanne Walsh, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 17 days.

(21) Appl. No.: 18/343,919

(22) Filed: Jun. 29, 2023

(65) Prior Publication Data

US 2025/0004869 A1    Jan. 2, 2025

(51) Int. Cl.
*G06F 11/00* (2006.01)
*G06F 11/07* (2006.01)

(52) U.S. Cl.
CPC ...... *G06F 11/0775* (2013.01); *G06F 11/0793* (2013.01)

(58) Field of Classification Search
CPC ............ G06F 11/0775; G06F 11/0793; G06F 11/0721
See application file for complete search history.

(56) References Cited

U.S. PATENT DOCUMENTS

| | | |
|---|---|---|
| 7,315,805 B2 | 1/2008 | Slater |
| 10,168,691 B2 | 1/2019 | Zornio et al. |
| 10,936,479 B2 | 3/2021 | Maag et al. |
| 11,101,037 B2 | 8/2021 | Allen |
| 11,221,270 B2 | 1/2022 | Evans |
| 11,341,605 B1 * | 5/2022 | Singh .................. H04L 67/1095 |
| 11,853,853 B1 | 12/2023 | Beauchesne et al. |
| 12,008,046 B1 | 6/2024 | Curtis et al. |

(Continued)

OTHER PUBLICATIONS

Wang, Haozhe, et al., "A graph neural network-based digital twin for network slicing management," IEEE Transactions on Industrial Informatics 18.2 (2020): 1367-1376 (10 Pages).

(Continued)

*Primary Examiner* — Katherine Lin
(74) *Attorney, Agent, or Firm* — Womble Bond Dickinson (US) LLP

(57) ABSTRACT

Methods and systems for managing operation of a data pipeline are disclosed. To manage the operation, a system may include one or more data sources, a data manager, and one or more downstream consumers. Requests for data from the downstream consumers may have unexpected characteristics that may cause misalignment of application programming interfaces used by the data pipeline. To remediate the misalignment and reduce occurrences of future misalignments, an error message may be obtained indicating a type of error associated with the request. The error message may be used to obtain an error classification for the request and an action set may be performed based on the error classification. In addition, data provided to the downstream consumers may cause misalignment of an application programming interface used by the downstream consumers. Similarly, an error message may be obtained and used to identify an appropriate action set to remediate the misalignment.

20 Claims, 7 Drawing Sheets

(56) References Cited

U.S. PATENT DOCUMENTS

| | | |
|---|---|---|
| 2004/0064750 A1 | 4/2004 | Conway |
| 2006/0009881 A1 | 1/2006 | Ferber et al. |
| 2014/0037161 A1 | 2/2014 | Rucker |
| 2014/0136184 A1 | 5/2014 | Hatsek |
| 2016/0098037 A1 | 4/2016 | Zornio |
| 2018/0081871 A1 | 3/2018 | Williams |
| 2019/0034430 A1 | 1/2019 | Das |
| 2019/0236204 A1 | 8/2019 | Canim |
| 2020/0166558 A1 | 5/2020 | Weis |
| 2020/0167224 A1* | 5/2020 | Abali ............... G06F 11/0721 |
| 2020/0202478 A1 | 6/2020 | Thumpudi et al. |
| 2020/0293684 A1 | 9/2020 | Harris |
| 2021/0027771 A1 | 1/2021 | Hall |
| 2021/0116505 A1 | 4/2021 | Shu |
| 2021/0374143 A1 | 12/2021 | Neill |
| 2021/0406110 A1 | 12/2021 | Vaid et al. |
| 2022/0092234 A1 | 3/2022 | Karri |
| 2022/0301027 A1 | 9/2022 | Basta |
| 2022/0310276 A1 | 9/2022 | Wilkinson |
| 2023/0040834 A1 | 2/2023 | Haile |
| 2023/0126260 A1 | 4/2023 | Elsakhawy et al. |
| 2023/0153095 A1 | 5/2023 | Rahill-Marier |
| 2023/0213930 A1 | 7/2023 | Rakshit |
| 2023/0315078 A1 | 10/2023 | Sepulveda et al. |
| 2023/0418280 A1 | 12/2023 | Emery |
| 2024/0235952 A9 | 7/2024 | Hicks |
| 2024/0281419 A1 | 8/2024 | Alfaras |
| 2024/0330136 A1 | 10/2024 | Furlong |

OTHER PUBLICATIONS

Wang, Haozhe, et al., "A graph neural network-based digital twin for network slicing management," IEEE Transactions on Industrial Informatics 18.2 (2020): 1367-1376 (11 Pages).

Almasan, Paul, et al., "Digital Twin Network: Opportunities and challenges," arXiv preprint arXiv:2201.01144 (2022) (7 Pages).

Hu, Weifei, et al., "Digital twin: A state-of-the-art review of its enabling technologies, applications and challenges," Journal of Intelligent Manufacturing and Special Equipment 2.1 (2021): 1-34 (34 Pages).

Khan, Latif U., et al., "Digital-Twin-Enabled 6G: Vision, Architectural Trends, and Future Directions," IEEE Communications Magazine 60.1 (2022): 74-80 (7 Pages).

Nguyen, Huan X., et al., "Digital Twin for 5G and Beyond," IEEE Communications Magazine 59.2 (2021): 10-15. (12 Pages).

Wang, Danshi, et al., "The Role of Digital Twin in Optical Communication: Fault Management, Hardware Configuration, and Transmission Simulation," IEEE Communications Magazine 59.1 (2021): 133-139 (6 Pages).

Pang, Toh Yen, et al., "Developing a digital twin and digital thread framework for an 'Industry 4.0' Shipyard," Applied Sciences 11.3 (2021): 1097 (22 Pages).

Isto, Pekka, et al., "5G based machine remote operation development utilizing digital twin," Open Engineering 10.1 (2020): 265-272 (8 Pages).

Redick, William, "What is Outcome-Based Selling?" Global Performance, Web Page <https://globalperformancegroup.com/what-is-outcome-based-selling/> accessed on Feb. 14, 2023 (8 Pages).

"The Best Data Curation Tools for Computer Vision in 2022," Web Page <https://www.lightly.ai/post/data-curation-tools-2022> accessed on Feb. 14, 2023 (9 Pages).

Bebee, Troy et al., "How to detect machine-learned anomalies in real-time foreign exchange data," Google Cloud, Jun. 10, 2021, Web Page <https://cloud.google.com/blog/topics/financial-services/detect-anomalies-in-real-time-forex-data-with-ml> accessed on Feb. 14, 2023 (16 Pages).

* cited by examiner

SYSTEM AND METHOD FOR REMEDIATING MISALIGNMENT OF A DATA PIPELINE USING ERROR MESSAGES

FIELD

Embodiments disclosed herein relate generally to data management. More particularly, embodiments disclosed herein relate to systems and methods to manage data using data pipelines.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components and the components of other devices may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

DETAILED DESCRIPTION

Figure 1:
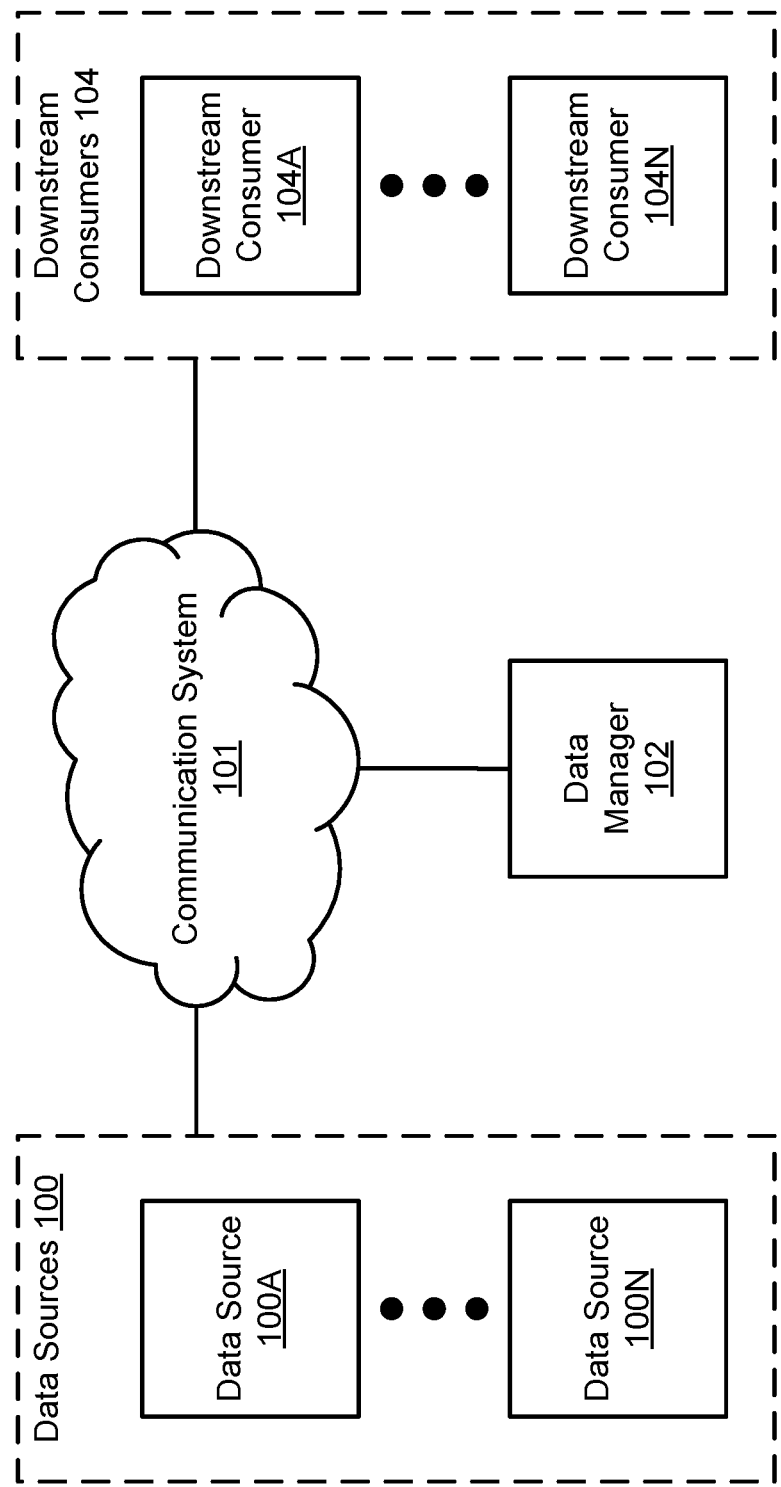
FIG. 1 shows a block diagram illustrating a system in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

In general, embodiments disclosed herein relate to methods and systems for managing data pipelines. Data usable by a data pipeline may be obtained from any number of data sources. Application programming interfaces (APIs) used by the data pipeline may be configured to consume data with certain characteristics (e.g., a certain number of parameters, a certain ordering of the parameters, etc.). Data obtained and fed into the data pipeline via an API that does not meet these characteristics may cause misalignment (e.g., non-nominal operation) of one or more APIs used by the data pipeline. Misalignment of the one or more APIs may result in no response from an API, a response in an unexpected or otherwise unusable format, and/or other errors. Therefore, a result of a call (e.g., a request for data) to an API may result in a failure to provide a response to downstream consumers of the data and/or a subsequent interruption to computer-implemented services provided by the downstream consumers.

In a first example, an API may be unable to process a request for data from one or more downstream consumers and, therefore, the data pipeline may become misaligned (e.g., a mismatch may occur between what is expected to be included in an API call and what is actually included in the API call). As a result, the API may not return any response to the downstream consumers and interruptions may be caused to computer-implemented services performed using the data.

In a second example, the request from the downstream consumers may be successfully processed by the API and data responsive to the request may be provided to the downstream consumers. However, the downstream consumers may be incapable of using the data provided by the request due to, for example, misalignment of one or more APIs used by the downstream consumers.

To remediate the misalignment of the one or more APIs, the system may obtain an error message, the error message indicating a type of error (an error associated with the request from the downstream consumers and/or with the data provided to the downstream consumers). The data may be classified to obtain an error classification using the error message and the data. The error classification may indicate that an unexpected parameter was included in the data and/or request, that an expected parameter was missing from the data and/or the request, and/or may indicate other types of errors.

Following obtaining the error classification, the system may determine a remedial action set in response to the type of the error. To implement the remedial action set, the system may generate a translation layer for the application programming interface. The translation layer may be keyed to the downstream consumers and may modify data prior to providing the data to the downstream consumers and/or may modify future requests from the downstream consumers prior to processing the requests.

By doing so, the system may respond efficiently to misalignment of one or more APIs used by the data pipeline and may perform remedial actions in response to errors responsible for the misalignment. Consequently, future incidents of misalignment of the data pipeline may be reduced (and/or swiftly remediated) and downstream consumers associated with the data pipeline may more reliably provide computer-implemented services based on data managed by the data pipeline.

In an embodiment, a method of managing a data pipeline is provided. The method may include: making a first identification of an occurrence of an event indicating that a misalignment of the data pipeline has occurred; obtaining, in response to the first identification, at least one error message, the at least one error message comprising one selected from a list consisting of: a first error message generated by an application programming interface following receipt of a request for data by one or more downstream consumers using the application programming interface; and a second error message obtained from the one or more downstream consumers following an attempt to provide data to the one or more downstream consumers using the application programming interface, the data being responsive to a request for the data from the one or more downstream consumers; initiating an error classification using the at least one error message and the data to obtain an error classification for the data; making a second identification of an action set intended to remediate a type of error indicated by the error classification; and initiating, in response to the second identification, performance of the action set to remediate the misalignment.

The first error message may be generated in response to the application programming interface being unable to process the request for the data from the one or more downstream consumers.

The second error message may be generated due to an inability of the one or more downstream consumers to use a response provided by the application programming interface, the response being generated by the application programming interface as a result of processing the request for the data.

The error classification may include at least one consisting from a list of error classifications consisting of: a first error classification, the first error classification indicating that the data comprises at least one extra parameter; a second error classification, the second error classification indicating that the data lacks at least one expected parameter; a third error classification, the third error classification indicating a change in a system of representation of information conveyed by the data; and a fourth error classification, the fourth error classification indicating a re-ordering of fields of the data.

The action set may include: obtaining a translation layer for the application programming interface, the translation layer being intended to perform at least a portion of the action set to remediate a type of error associated with the error classification.

The translation layer for the application programming interface may be keyed to the one or more downstream consumers to modify requests from the one or more downstream consumers prior to processing by the application programming interface, or to modify responses from the application programming interface prior to interpretation by the one or more downstream consumers.

The action set may also include: in an instance where the error classification is the first error classification: prior to obtaining the translation layer: identifying the extra parameter; based on the identification, building the translation layer to discard the extra parameter from the data pipeline to obtain updated data; and continuing operation of the data pipeline using the translation layer.

The action set may also include: in an instance where the error classification is the second error classification: prior to obtaining the translation layer: identifying the at least one parameter that is lacked; based on the identification, building the translation layer to: obtain a synthetic parameter using historic data; and add the synthetic parameter to the data pipeline to obtain updated data; and continuing operation of the data pipeline using the translation layer.

The action set may also include: in an instance where the error classification is the third error classification: prior to obtaining the translation layer: identifying the changed system of representation of the information; based on the identification, building the translation layer to update the data pipeline based on the changed system of representation of the information; and continuing operation of the data pipeline using the translation layer.

The action set may also include: in an instance where the error classification is the fourth error classification: prior to obtaining the translation layer: identifying the re-ordering of the fields of the data; based on the identification, building the translation layer to update the data based on the re-ordering of the fields of the data to obtain updated data; and continuing operation of the data pipeline using the translation layer.

In an embodiment, a non-transitory media is provided that may include instructions that when executed by a processor cause the computer-implemented method to be performed.

In an embodiment, a data processing system is provided that may include the non-transitory media and a processor, and may perform the computer-implemented method when the computer instructions are executed by the processor.

Turning to FIG. 1, a block diagram illustrating a system in accordance with an embodiment is shown. The system shown in FIG. 1 may provide computer-implemented services utilizing data obtained from any number of data sources and managed by a data manager prior to performing the computer-implemented services. The computer-implemented services may include any type and quantity of computer-implemented services. For example, the computer-implemented services may include monitoring services (e.g., of locations), communication services, and/or any other type of computer-implemented services.

To facilitate the computer-implemented services, the system may include data sources 100. Data sources 100 may include any number of data sources. For example, data sources 100 may include one data source (e.g., data source 100A) or multiple data sources (e.g., 100A-100N). Data sources 100 may include any number of internal data sources (e.g., data sources managed and curated by the system of FIG. 1) and/or external data sources (e.g., data sources managed and curated by other entities). Each data source of data sources 100 may include hardware and/or software components configured to obtain data, store data, provide data to other entities, and/or to perform any other task to facilitate performance of the computer-implemented services.

All, or a portion, of data sources 100 may provide (and/or participate in and/or support the) computer-implemented services to various computing devices operably connected to data sources 100. Different data sources may provide similar and/or different computer-implemented services.

For example, data sources 100 may include any number of temperature sensors positioned in an environment to collect temperature measurements according to a data collection schedule. Data sources 100 may be associated with a data pipeline and, therefore, may collect the temperature measurements, may perform processes to sort, organize, format, and/or otherwise prepare the data for future processing in the data pipeline, and/or may provide the data to other data processing systems in the data pipeline (e.g., via one or more application programming interfaces (APIs)).

Data sources 100 may provide data to data manager 102. Data manager 102 may include any number of data processing systems including hardware and/or software components configured to facilitate performance of the computer-implemented services. Data manager 102 may include a database (e.g., a data lake, a data warehouse, etc.) to store data obtained from data sources 100 (and/or other entities throughout a distributed environment).

Data manager 102 may obtain data (e.g., from data sources 100), process the data (e.g., clean the data, transform the data, extract values from the data, etc.), store the data, and/or may provide the data to other entities (e.g., downstream consumer 104) as part of facilitating the computer-implemented services.

Continuing with the above example, data manager 102 may obtain the temperature measurements from data sources 100 as part of the data pipeline. Data manager 102 may obtain the temperature measurements via a request through an API and/or via other methods. Data manager 102 may curate the temperature data (e.g., identify errors/omissions and correct them, etc.) and may store the curated temperature data temporarily and/or permanently in a data lake or other storage architecture. Following curating the temperature data, data manager 102 may provide the temperature measurements to other entities for use in performing the computer-implemented services.

Data managed by data manager 102 (e.g., stored in a data repository managed by data manager 102, obtained directly from internet of things (IoT) devices managed by data manager 102, etc.) may be provided to downstream consumers 104. Downstream consumers 104 may utilize the data from data sources 100 and/or data manager 102 to provide all, or a portion of, the computer-implemented services. For example, downstream consumers 104 may provide computer-implemented services to users of downstream consumers 104 and/or other computing devices operably connected to downstream consumers 104.

Downstream consumers 104 may include any number of downstream consumers (e.g., 104A-104N). For example, downstream consumers 104 may include one downstream consumer (e.g., 104A) or multiple downstream consumers (e.g., 104A-104N) that may individually and/or cooperatively provide the computer-implemented services.

All, or a portion, of downstream consumers 104 may provide (and/or participate in and/or support the) computer-implemented services to various computing devices operably connected to downstream consumers 104. Different downstream consumers may provide similar and/or different computer-implemented services.

Continuing with the above example, downstream consumers 104 may utilize the temperature data from data manager 102 as input data for climate models. Specifically, downstream consumers 104 may utilize the temperature data to simulate future temperature conditions in various environments over time (e.g., to predict weather patterns, climate change, etc.).

Data obtained from data sources 100 may be used by the data pipeline (e.g., may be stored by data manager 102, provided to downstream consumers 104, etc.). Any number of APIs may be integrated into the data pipeline to facilitate communication between components of the data pipeline. To support nominal operation of the APIs, requests for data from downstream consumers 104 and/or data from data sources 100 may be expected have certain characteristics (e.g., certain parameters, certain ordering of parameters, certain numbers of parameters, etc.). Requests for data from downstream consumers 104 and/or data obtained from data sources 100 that do not have the expected characteristics may cause misalignment of an API and, therefore, non-nominal operation of the data pipeline.

In general, embodiments disclosed herein may provide methods, systems, and/or devices for remediating misalignment of APIs due to a delta between parameters expected by APIs used by the data pipeline and parameters encountered by the APIs. To do so, the system of FIG. 1 may monitor operation of the data pipeline to identify non-nominal operation of the data pipeline (e.g., misalignment of an API, etc.). When non-nominal operation of the data pipeline is identified, the system may obtain an error message and, based on the error message, may obtain an error classification for the data and/or the request.

In response to obtaining the error classification, the system of FIG. 1 may identify a corresponding action set and may initiate performance of the action set to remediate the misalignment of the data pipeline. The action set may include, for example, generating a translation layer for an API, the translation layer being keyed to one or more downstream consumers of downstream consumers 104. The translation layer may modify data and/or requests for data prior to encountering the API and, therefore, avoiding future misalignment of the data pipeline.

To provide the above noted functionality, the system of FIG. 1 may: (i) make a first identification of an occurrence of an event indicating that a misalignment of a data pipeline has occurred, (ii) obtain, in response to the first identification, at least one error message, (iii) initiate an error classification process using the at least one error message and the data to obtain an error classification for the data, (iv) make a second identification of an action set intended to remediate a type of error indicated by the error classification, and/or (v) initiate, in response to the second identification, performance of the action set to remediate the misalignment.

Figure 2A:
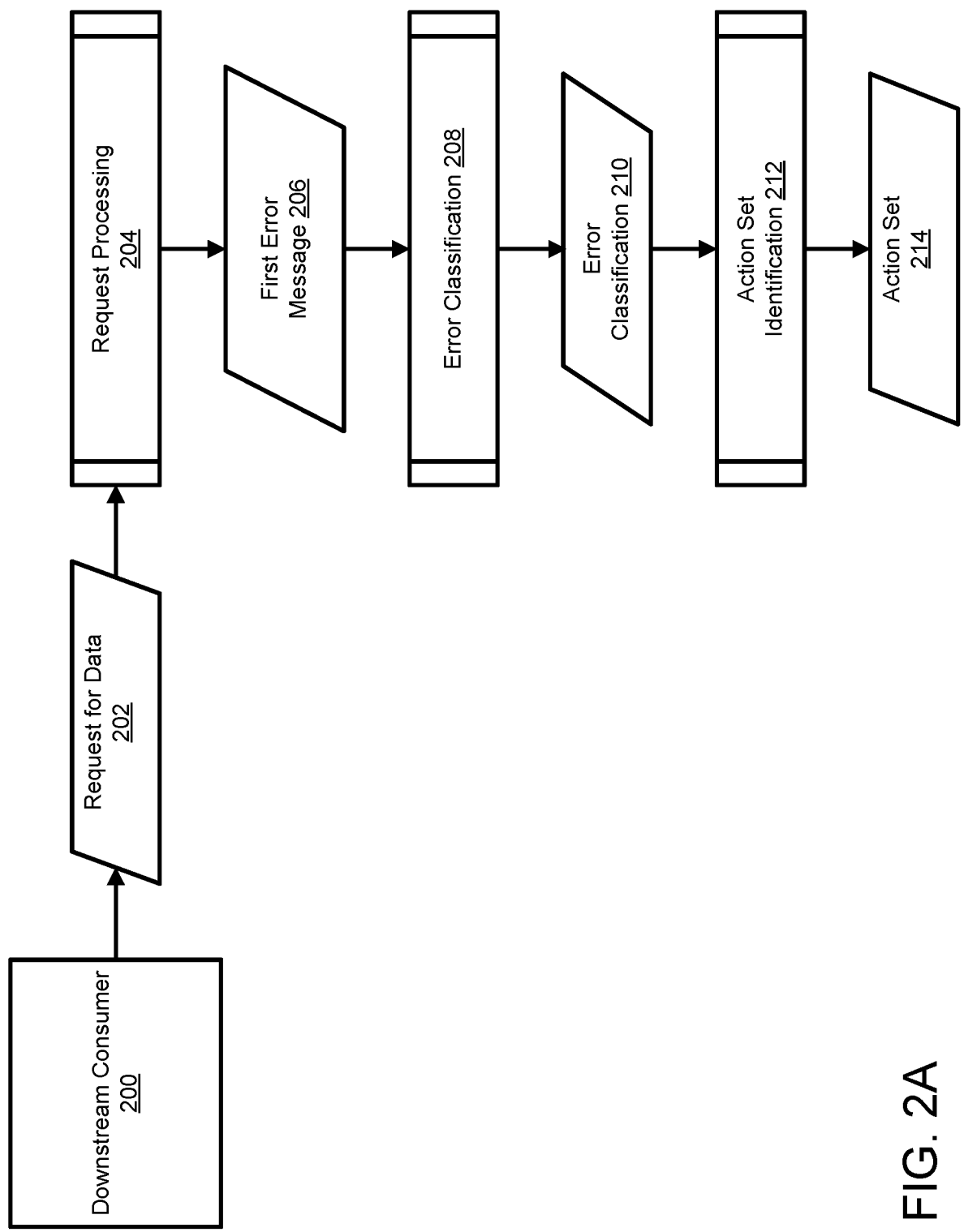
FIG. 2A shows a block diagram illustrating data flow during remediation of a misalignment of a data pipeline in which an application programming interface is unable to process a request from one or more downstream consumers in accordance with an embodiment.
Figure 2B:
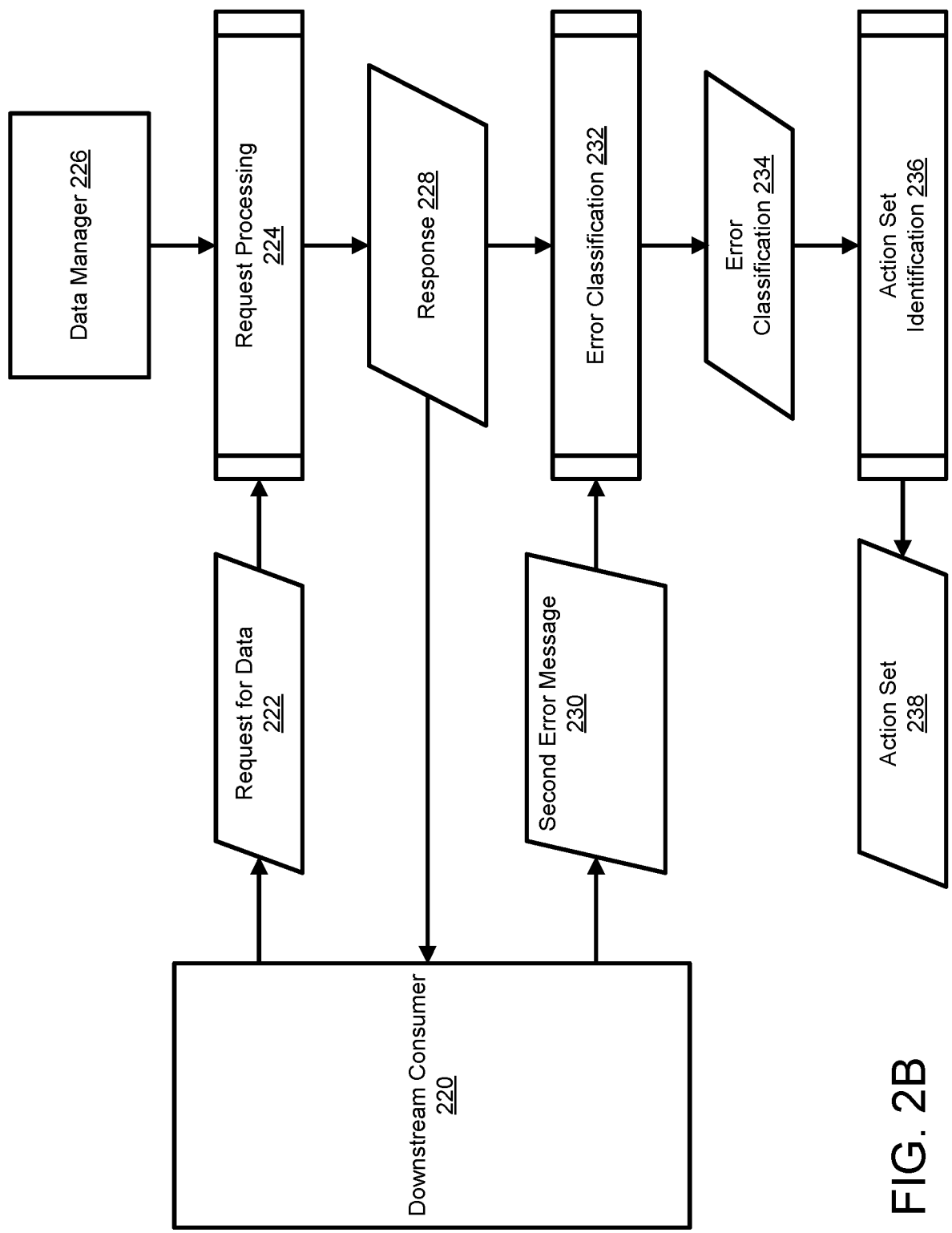
FIG. 2B shows a block diagram illustrating data flow during remediation of a misalignment of a data pipeline using an error message from one or more downstream consumers in accordance with an embodiment.
Figure 3:
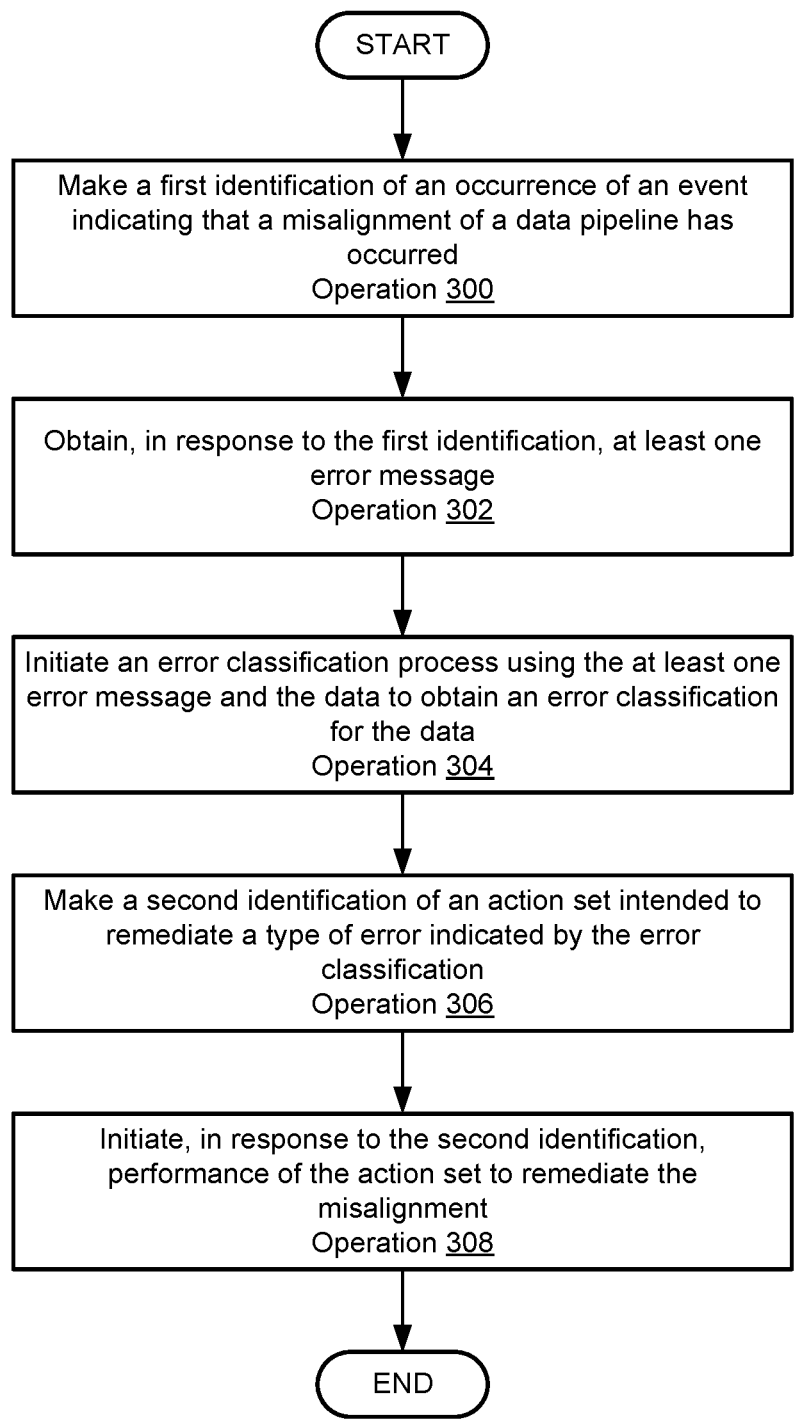
FIG. 3 shows a flow diagram illustrating a method of managing a data pipeline in accordance with an embodiment.

When performing its functionality, data sources 100, data manager 102, and/or downstream consumers 104 may perform all, or a portion, of the methods and/or actions shown in FIGS. 2A-3.

Data sources 100, data manager 102, and/or downstream consumers 104 may be implemented using a computing device such as a host or a server, a personal computer (e.g., desktops, laptops, and tablets), a "thin" client, a personal digital assistant (PDA), a Web enabled appliance, a mobile phone (e.g., Smartphone), an embedded system, local controllers, an edge node, and/or any other type of data processing device or system. For additional details regarding computing devices, refer to FIG. 5.

In an embodiment, one or more of data sources 100, data manager 102, and/or downstream consumers 104 are implemented using an internet of things (IoT) device, which may include a computing device. The IoT device may operate in accordance with a communication model and/or management model known to data sources 100, data manager 102, downstream consumers 104, other data processing systems, and/or other devices.

Any of the components illustrated in FIG. 1 may be operably connected to each other (and/or components not illustrated) with a communication system 101. In an embodiment, communication system 101 may include one or more networks that facilitate communication between any number of components. The networks may include wired networks and/or wireless networks (e.g., and/or the Internet). The networks may operate in accordance with any number and types of communication protocols (e.g., such as the internet protocol).

While illustrated in FIG. 1 as including a limited number of specific components, a system in accordance with an embodiment may include fewer, additional, and/or different components than those illustrated therein.

To further clarify embodiments disclosed herein, diagrams illustrating data flows and/or processes performed in a system in accordance with an embodiment are shown in FIGS. 2A-2B.

FIG. 2A shows a block diagram illustrating data flow during remediation of a misalignment of a data pipeline in which an API is incapable of processing a request from one or more downstream consumers in accordance with an embodiment. The processes shown in FIG. 2A may be performed by any entity shown in the system of FIG. 1 (e.g., a data source similar to data source 100A, a data manager similar to data manager 102, a downstream consumer similar to downstream consumer 104A, etc.) and/or another entity without departing from embodiments disclosed herein.

Downstream consumer 200 may be similar (as previously mentioned) to any of downstream consumers 104 shown in FIG. 1. Downstream consumer 200 may provide computer-implemented services using data managed by a data pipeline. To do so, downstream consumer 200 may submit requests (e.g., request for data 202, etc.) to other portions of the data pipeline for data as needed and the other portions of the data pipeline may provide the requested data to downstream consumer 200 as part of operation of the data pipeline.

In response to a need for data (e.g., to provide computer-implemented services using the data), downstream consumer 200 may generate request for data 202 and may provide request for data 202 to another portion of the data pipeline via an API used by the data pipeline. Request for data 202 may include one or more identifiers (e.g., known parameters) associated with the data of interest to downstream consumer 200. Therefore, downstream consumer 200 may expect that the information included in request for data 202 is in a format that is able to be understood and processed by other entities associated with the data pipeline. Therefore, providing request for data 202 may include transmission of a message, may include inputting information into the API, etc.

Request for data 202 may be usable to perform request processing 204 process. Request processing 204 process may include reading information provided to an API (request for data 202) and attempting to generate a response to request for data 202 based on expected parameters of input for the API and associated response processes. However, a format for information provided by request for data 202 (e.g., a name of a parameter, etc.) may not match an expected format for the information (e.g., an expected name of the parameter, etc.). Therefore, the API may not be able to process request for data 202 and may generate at least one error message (e.g., first error message 206).

First error message 206 may be generated by the API following receipt of a request for data (e.g., request for data 202) by one or more downstream consumers (e.g., downstream consumer 200) using the API. First error message 206 may be generated in response to the API being unable to process request for data 202 from downstream consumer 200. First error message 206 may include an indicator for a type of error associated with request for data 202. The indicator may include, for example, a description of the error (e.g., a notification of a missing parameter in request for data 202) and/or may include metadata that may be used to infer the type of the error (e.g., using an inference model).

First error message 206 may be usable to perform error classification 208 process. Error classification 208 process may include utilizing information from first error message 206 to obtain error classification 210. Error classification 208 process may include matching the identifier (and/or other information from first error message 206) to a set of known error classifications (not shown). The set of the known error classifications may include: (i) a first error classification, the first error classification indicating that the data may include at least one extra parameter, (ii) a second error classification, the second error classification indicating that the data may lack at least one expected parameter, (iii) a third error classification, the third error classification indicating a change in a system of representation of information conveyed by the data, and/or (iv) a fourth error classification, the fourth error classification indicating a re-ordering of fields of responses from the API. The set of the known error classifications may include other types of error classifications without departing from embodiments disclosed herein.

The first error classification may indicate, for example, that one or more parameters (e.g., variables, etc. shown in an extra field of the request) included in request for data 202 is unexpected by an API used by another portion of the data pipeline to process request for data 202. Therefore, the unexpected parameter may make request for data 202 impossible to respond to according to previously agreed upon restrictions for request formatting.

The second error classification may indicate, for example, that one or more of the parameters expected (by the API) to be included in request for data 202 according to the previously agreed upon restrictions for request formatting is missing. Therefore, a field of request for data 202 may be empty and the API may be unable to process and/or respond to request for data 202.

The third error classification may indicate, for example, that one or more of the entries in fields of request for data 202 is unfamiliar to the API attempting to process request for data 202. Due to the inability of the API to recognize the system of representing information used by request for data 202, the API may be unable to process and/or respond to request for data 202.

The fourth error classification may indicate, for example, that one or more of the parameters included in request for data 202 is in an unexpected order and/or is represented using an unexpected naming convention when compared to the order and naming conventions included in the previously agreed upon restrictions for request formatting. Therefore, the API may be unable to process and/or respond to request for data 202.

As previously mentioned, error classification 210 may include one of the previously described error classifications and/or may include other types of error classifications. In response to obtaining error classification 210, the system may perform action set lookup 212 process to identify an action set intended to remediate the type of error indicated by error classification 210. Action set lookup 212 process may include, for example, performing a lookup process using an action set lookup table and error classification 210 as a key for the action set lookup table. Action set lookup 212 process may include generating identification of action set 214.

Action set 214 may include instructions for remediation of the type of error associated with error classification 210. The instructions may be intended to be performed by an entity to avoid future misalignment of the data pipeline. Action set 214 may include instructions for implementing any number of action sets responsive to errors identified by error classification 210.

For example, action set 214 may include instructions for generating and implementing a translation layer for the API, the translation layer being intended to perform at least a portion of the action set to remediate the type of the error associated with error classification 210. The translation layer for the API may be keyed to one or more downstream consumers (e.g., downstream consumer 200) to modify requests from downstream consumer 200 prior to processing by the API, and/or to modify responses from the API prior to interpretation by downstream consumer 200.

In FIG. 2A, the translation layer (not shown) may be implemented in the API used to process request for data 202 (and other requests) to transform parameters included in an API call from downstream consumer 200. By doing so, the API call may be readable and interpretable by the API. In addition, the API call may include an identifier for downstream consumer 200, the identifier indicating that the translation layer should be activated and used prior to attempting to process future requests from downstream consumer 200. By doing so, the functionality of the API may be unchanged, and the translation layer may only be implemented when API calls are obtained from downstream consumer 200. Other translation layers may be implemented and may be keyed to other downstream consumers to remediate other types of errors associated with misalignment of one or more APIs used by the data pipeline.

Refer to FIG. 3 for additional details regarding performing action sets tailored to each type of the four potential error classification listed above.

Turning to FIG. 2B, a block diagram illustrating data flow during remediation of a misalignment of a data pipeline using an error message from one or more downstream consumers in accordance with an embodiment is shown. The processes shown in FIG. 2B may be performed by any entity shown in the system of FIG. 1 (e.g., a data source similar to data source 100A, a data manager similar to data manager 102, a downstream consumer similar to downstream consumer 104A, etc.) and/or another entity without departing from embodiments disclosed herein.

Downstream consumer 220 may be similar to any of downstream consumers 104 shown in FIG. 1. Downstream consumer 220 may generate request for data 222. Request for data 222 may be similar to request for data 202 shown in FIG. 2A. However, request for data 222 may include parameters of a request that are expected by an API used by another portion of the data pipeline to process request for data 222 and, therefore, the API may be capable of processing request for data 222 via request processing 224 process. Request processing 224 process may be similar to request processing 204 process shown in FIG. 2A.

However, request processing 224 process may utilize an indicator included in request for data 222 to identify data responsive to request for data 222 using data manager 226 (via, for example, accessing a data repository managed by data manager 226). Data manager 226 may be similar to data manager 102 shown in FIG. 1. Data manager 226 may manage (e.g., via storage in a temporary and/or permanent storage system) data obtained from any number of data sources (e.g., similar to data sources 100 shown in FIG. 1) associated with the data pipeline.

In response to request for data 222 being processed by an API (via request processing 224 process), response 228 may be generated. Response 228 may include a series of fields, each field of the series of fields including one or more parameters associated with data provided by data manager 226 responsive to request for data 222. Response 228 may be provided to downstream consumer 220 via the API.

In FIG. 2B, downstream consumer 220 may be incapable of using data provided in response 228 (due to, for example, misalignment of a second API used by downstream consumer 220 as part of the data pipeline and to facilitate performance of computer-implemented services using the data). Therefore, downstream consumer 220 may generate at least one error message (e.g., second error message 230).

Second error message 230 may be generated by one or more APIs usable by downstream consumer 220 following receipt of response 228. Second error message 230 may be obtained from downstream consumer 220 following an attempt to provide data to downstream consumer 220 using the API, the data being responsive to a request for the data (e.g., request for data 222) from downstream consumer 220. Second error message 230 may be generated due to an inability of downstream consumer 220 to use response 228 provided by the API, response 228 being generated by the API as a result of processing request for data 222.

Second error message may include an indicator for the at least one type of error associated with response 228. The indicator may include, for example, a description of the error (e.g., a notification of a missing parameter in response 228) and/or may include metadata that may be used to infer the type of the error (e.g., using an inference model).

Second error message 230 may be usable to perform error classification 232 process. Error classification 232 process may include utilizing information from second error message 230 to obtain error classification 234. Error classification 232 process may include matching the identifier (and/or other information included in second error message 230) to a set of known error classifications (not shown). The set of the known error classifications may include: (i) the first error classification described in FIG. 2A, (ii) the second error classification described in FIG. 2A, (iii) a third error classification described in FIG. 2A, and/or (iv) the fourth error classification described in FIG. 2A. The set of the known error classifications may include other types of error classifications without departing from embodiments disclosed herein.

The first error classification may indicate, for example, that one or more parameters (e.g., variables, etc. shown in an extra field of response 228) included in response 228 is unexpected by an API used by downstream consumer 220. Therefore, the unexpected parameter may make data provided by response 228 impossible for downstream consumer 220 to use (e.g., to perform computer-implemented services).

The second error classification may indicate, for example, that one or more of the parameters expected (by an API used by downstream consumer 220) to be included in fields of response 228 according to the previously agreed upon restrictions for response formatting is missing. Therefore, a field of response 228 may be empty and the API used by downstream consumer 220 may be unable to process and/or otherwise use data from response 228 (e.g., to provide computer-implemented services).

The third error classification may indicate, for example, that one or more of the entries in fields of response 228 is unfamiliar to the API used by downstream consumer 220 attempting to process response 228. Due to the inability of the API to recognize the system of representing information used by request for data 202, the API may be unable to process and/or otherwise use data from response 228 (e.g., to provide computer-implemented services).

The fourth error classification may indicate, for example, that one or more of the parameters included in response 228 is in an unexpected order and/or is represented using an unexpected naming convention when compared to the order and naming conventions included in the previously agreed upon restrictions for response formatting. Therefore, the API used by downstream consumer 220 may be unable to process and/or otherwise use data from response 228 (e.g., to provide computer-implemented services).

As previously mentioned, error classification 234 may include one of the previously described error classifications and/or may include other types of error classifications. In response to obtaining error classification 234, the system may perform action set lookup 236 process to identify an action set intended to remediate the type of error indicated by error classification 234. Action set lookup 236 process may include, for example, performing a lookup process using an action set lookup table and error classification 234 as a key for the action set lookup table. Action set lookup 236 process may include generating identification of action set 238.

Action set 238 may include instructions for remediation of the type of error associated with error classification 234. The instructions may be intended to be performed by an entity to avoid future misalignment of the data pipeline. Action set 238 may include instructions for implementing any number of action sets responsive to errors identified by error classification 234.

For example, action set 238 may include instructions for generating and implementing a translation layer for the API, the translation layer being intended to perform at least a portion of the action set to remediate the type of the error associated with error classification 234. The translation layer for the API may be keyed to one or more downstream consumers (e.g., downstream consumer 220) to modify requests from downstream consumer 220 prior to processing by the API, or to modify responses from the API prior to interpretation by downstream consumer 220.

In FIG. 2B, the translation layer (not shown) may be implemented in the API in order to transform parameters included in responses to API calls from downstream consumer 220 in order to make the data included in the responses usable by downstream consumer 220. In addition, the API call may include an identifier for downstream consumer 220, the identifier indicating that the translation layer should be activated and used prior to attempting to process future requests from downstream consumer 220. By doing so, the functionality of the API may be unchanged, and the translation layer may only be implemented when API calls are obtained from downstream consumer 220. Other translation layers may be implemented and may be keyed to other downstream consumers to remediate other types of errors associated with misalignment of one or more APIs used by the data pipeline.

Refer to FIG. 3 for additional details regarding performing action sets tailored to each type of the four potential error classification listed above.

In an embodiment, the one or more entities performing the operations shown in FIG. 2A-2B are implemented using a processor adapted to execute computing code stored on a persistent storage that when executed by the processor performs the functionality of the system of FIG. 1 discussed throughout this application. The processor may be a hardware processor including circuitry such as, for example, a central processing unit, a processing core, or a microcontroller. The processor may be other types of hardware devices for processing information without departing from embodiments disclosed herein.

As discussed above, the components of FIG. 1 may perform various methods to manage operation of a data pipeline. FIG. 3 illustrates methods that may be performed by the components of FIG. 1. In the diagram discussed below and shown in FIG. 3, any of the operations may be repeated, performed in different orders, and/or performed in parallel with or in a partially overlapping in time manner with other operations.

Turning to FIG. 3, a flow diagram illustrating a method of managing a data pipeline in accordance with an embodiment is shown. The method may be performed, for example, by a data source, data manager, downstream consumer, and/or any other entity.

At operation 300, a first identification is made of an occurrence of an event indicating that a misalignment of a data pipeline has occurred. The first identification may be made by determining whether any APIs are misaligned due to operation of the data pipeline (e.g., following, for example, receipt of a request for data from a downstream consumer and/or providing data to the downstream consumer in response to the request for the data).

Determining whether any APIs are misaligned due to the operation of the data pipeline may include: (i) obtaining a performance report during and/or following the operation of the data pipeline and/or (ii) failing to obtain a performance alert indicating misalignment of one or more APIs used by the data pipeline. The performance report may be generated automatically at regular intervals, may be generated upon request, and/or may be obtained via other methods and/or schedules without departing from embodiments disclosed herein. The performance report may include an indication of nominal or non-nominal operation of any APIs used by the data pipeline.

At operation 302, at least one error message is obtained in response to the first identification. Obtaining the at least one error message may include: (i) reading the at least one error message from storage, (ii) requesting the at least one error message from one or more entities responsible for monitoring the operation of the data pipeline and receiving the at least one error message as a transmission in response to the request. (iii) receiving the at least one error message from the one or more entities automatically (e.g., according to some previously determined schedule, etc.), (iv) accessing a database (locally or off-site) in which the at least one error message is stored, and/or (v) any other method of obtaining the at least one error message.

At operation 304, an error classification process is initiated using the at least one error message and the data to obtain an error classification for the data. Initiating the error classification process may include: (i) performing the error classification process (ii) providing instructions to another entity to perform the error classification process, (iii) and/or other methods without departing from embodiments disclosed herein.

Performing the error classification process may include: (i) obtaining information indicating a type of error from the at least one error message, (ii) utilizing the information indicating the type of the error and the data to obtain the error classification.

Obtaining the information indicating the type of the error from the at least one error message may include: (i) obtaining an error description (e.g., a text description, an identifier usable to look up a type of error, etc.) from the error message, (ii) obtaining metadata from the error message, and/or (iii) obtaining other types of information from the at least one error message. The metadata may be fed into an inference model, rules-based engine, and/or other predictive model to predict types of errors in response to the information obtained from error messages.

Utilizing the information indicating the type of the error and the data to obtain the error classification may include: (i)

performing an error classification lookup process using an error classification lookup table and the type of the error as a key for the error classification lookup table, (ii) transmitting the type of the error and the data (e.g., data responsive to a request from a downstream consumer) to another entity responsible for obtaining error classifications, (iii) feeding the type of the error and the data into an inference model trained to generate error classifications selected from a known set of error classifications, and/or (iv) other methods.

Performing the error classification process may also include identifying a source of the type of the error. Identifying the source of the type of the error may include: (i) comparing data responsive to a request from one or more downstream consumers (and/or the request itself) to an expectation for the data (and/or the request) based on historic data (and/or historic requests).

For example, the error classification may indicate that an expected parameter is missing from data provided in response to a request for the data. To determine which parameter is the missing parameter, the data provided to the one or more downstream consumers may be compared to historic data previously provided to the one or more downstream consumers in response to a previous request. Any parameter that was included in the historic data and is missing from the data may be identified as the missing parameter.

At operation 306, a second identification is made of an action set intended to remediate a type of error indicated by the error classification. Making the second identification of the action set may include: (i) performing an action set lookup process using an action set lookup table and the error classification as a key for the action set lookup table, (ii) by feeding the error classification into an inference model or rules-based engine and obtaining the action set as an output from the inference model or rules-based engine, (iii) by providing the error classification to another entity responsible for identifying the action set and obtaining the action set in response to the error classification from the entity, and/or (iv) other methods.

At operation 308, performance of the action set is initiated in response to the second identification to remediate the misalignment. Initiating, in response to the identification, performance of the action set may include: (i) performing the action set based on the error classification, (ii) transmitting the error classification to another entity along with instructions for performing the action set based on the error classification, and/or (iii) other methods.

The action set may include obtaining a translation layer for the API, the translation layer being intended to perform at least a portion of the action set to remediate the type of error associated with the error classification. Obtaining the translation layer may include: (i) generating the translation layer, (ii) reading the translation layer from storage, (iii) receiving the translation layer from another entity responsible for generating translation layers, and/or (iv) other methods.

In an instance where the error classification is the first error classification (the data includes an extra parameter), the action set may also include: (i) prior to obtaining the translation layer, identifying the extra parameter, (ii) based on the identification, building the translation layer to discard the extra parameter from the data pipeline to obtain updated data, and/or (iii) continuing operation of the data pipeline using the translation layer.

Identifying the extra parameter may include: (i) obtaining a list of expected parameters for the data (and/or the request), (ii) comparing the list of the expected parameters to a list of parameters of the data (and/or the request), and/or (iii) identifying a difference between the list of the expected parameters and the list of parameters, the difference including the extra parameter.

Obtaining a list of expected parameters for the data may include: (i) reading the list of the expected parameters for the data from storage (e.g., as part of the criteria included in the schema for identifying the types of the errors), (ii) generating the list of the expected parameters using historic data indicative of a number and type of parameters previously obtained from the data sources (and/or downstream consumers), and/or (iii) other methods.

Building the translation layer to discard the extra parameter may include: (i) generating (and/or otherwise obtaining) instructions (e.g., as a package of code, etc.) for discarding the extra parameter and/or (ii) implementing the instructions using the API. The instructions, when implemented, may cause: (i) storage of the extra parameter in a cache associated with one or more data processing systems used by the data pipeline, and/or (ii) deletion of the extra parameter from the data usable by the data pipeline to obtain the updated data. Discarding the extra parameter from the data pipeline may also include transmitting the data to another entity responsible for discarding the extra parameter and receiving the updated data in response.

Building the translation layer may also include transmitting the instructions to another entity responsible for building the translation layer and/or other methods without departing from embodiments disclosed herein.

Continuing the operation of the data pipeline using the translation layer may include: (i) feeding the data into the translation layer prior to processing the data and/or the request using the API, (ii) transmitting instructions to re-issue a request for the data to one or more downstream consumers and transforming the data (e.g., data obtained in response to the re-issued request and/or included in the re-issued request) using the translation layer, (iii) transmitting the data to another entity responsible for inputting the data into the data pipeline, and/or (iv) other methods.

In an instance where the error classification is the second error classification (data lacks at least one expected parameter), the action set may include: (i) prior to obtaining the translation layer, identifying the at least one parameter that is lacked, (ii) based on the identification, building the translation layer to obtain a synthetic parameter using historic data and add the synthetic parameter to the data pipeline to obtain updated data, and/or (iv) continuing operation of the data pipeline using the translation layer.

Identifying the at least one parameter that is lacked may include: (i) obtaining a list of expected parameters (e.g., for the data and/or the request), (ii) comparing the list of the expected parameters to a list of parameters of the data and/or request, and/or (iii) identifying a difference between the list of the expected parameters and the list of parameters, the difference including the at least one parameter that is lacked.

Obtaining the list of the expected parameters may include: (i) reading the list of the expected parameters from storage (e.g., as part of the criteria included in the schema for identifying the types of the errors), (ii) generating the list of the expected parameters using historic data indicative of a number and type of parameters previously obtained from the data sources (and/or the downstream consumers), and/or (iii) other methods.

Building the translation layer may include: (i) generating (and/or otherwise obtaining) instructions (e.g., as a package of code, etc.) for obtaining a synthetic parameter using historic data and/or adding the synthetic parameter to the data pipeline to obtain updated data and/or (ii) implementing the instructions using the API. The instructions, when implemented, may cause: (i) training an inference model using the historic data to predict missing parameters given other parameters as input for the inference model, (ii) feeding one or more of the parameters of the data into the inference model and/or (iii) obtaining the synthetic parameter as output from the inference model, the synthetic parameter being a prediction for the missing parameter.

Obtaining the synthetic parameter using the historic data may also include: (i) transmitting the historic data to another entity responsible for generating the synthetic parameter, (ii) generating the synthetic parameter based on a statistical characterization of the historic data (e.g., a mode for the at least one parameter that is lacked), and/or (iii) other methods.

Building the translation layer may also include transmitting the instructions to another entity responsible for building the translation layer and/or other methods without departing from embodiments disclosed herein.

Continuing the operation of the data pipeline using the translation layer may include: (i) feeding the data into the translation layer prior to processing the data and/or the request using the API, (ii) transmitting instructions to re-issue a request for the data to one or more downstream consumers and transforming the data (e.g., data obtained in response to the re-issued request and/or included in the re-issued request) using the translation layer, (iii) transmitting the data to another entity responsible for inputting the data into the data pipeline, and/or (iv) other methods.

In an instance where the error classification is the third error classification (a change in a system of representation of information conveyed by the data), the action set may include: (i) prior to obtaining the translation layer, identifying the changed system of representation of the information, (ii) based on the identification, building the translation layer to update the data pipeline based on the changed system of representation of the information, and/or (iii) continuing operation of the data pipeline using the translation layer.

Identifying the changed system of representation of the information may include: (i) requesting a re-issuing of a previous call to the API to obtain a new request and/or new data responsive to the previous call and/or (ii) comparing the new request (and/or new data) to an old request (and/or old data) from the previous call to identify the changed system of representation of the information.

Requesting a re-issuing of a previous call to the API may include: (i) transmitting a message to one or more downstream consumers requesting that the one or more downstream consumers re-issue a previous call, (ii) notifying another entity of the request for re-issuing of a previous call and instructing the other entity to initiate a re-issuing of the call by the one or more downstream consumers, and/or other (iii) other methods.

Comparing the new request (and/or new data) to the old response (and/or old data) from the previous call may include: (i) obtaining the old request and/or old data, (ii) obtaining a difference between the new request (and/or the new data) and the old response (and/or the old data), and/or (iii) generating a transformation process for interpreting new responses from the API based on the difference.

For example, a downstream consumer (e.g., a data processing system) associated with the data pipeline may regularly query an API for a response regarding whether rainfall occurred on specified days. The downstream consumer may have historically submitted requests to the API including a field indicating "rainfall yes or no?". However, following a change in the system of representation of the information conveyed by the response, the request may include a field indicating "rainfall true or false?"

Building the translation layer to update the data pipeline based on the changed system of representation may include: (i) generating (and/or otherwise obtaining) instructions (e.g., as a package of code, etc.) for updating the data pipeline and/or (ii) implementing the instructions using the API. The instructions, when implemented, may cause: (i) implementing the schema for interpreting new requests and or new data responsive to the new requests from the API so that any request and/or responses to the request that utilizes the new system of representation of information will be transformed into the old system of representation of information, (ii) transmitting the schema for interpreting new responses to another entity responsible for updating the data pipeline, and/or (iii) other methods.

Building the translation layer may also include transmitting the instructions to another entity responsible for building the translation layer and/or other methods without departing from embodiments disclosed herein.

Continuing the operation of the data pipeline using the translation layer may include: (i) feeding the data into the translation layer prior to processing the data and/or the request using the API, (ii) transmitting instructions to re-issue a request for the data to one or more downstream consumers and transforming the data (e.g., data obtained in response to the re-issued request and/or included in the re-issued request) using the translation layer, (iii) transmitting the data to another entity responsible for inputting the data into the data pipeline, and/or (iv) other methods.

In an instance where the error classification is the fourth error classification (a re-ordering of fields of the data), the action set may include: (i) prior to obtaining the translation layer, identifying the re-ordering of the fields of the data, (ii) based on the identification, building the translation layer to update the data pipeline based on the re-ordering of the fields of the data, and/or (iii) continuing operation of the data pipeline using the translation layer.

Identifying the re-ordering of the fields of the data may include: (i) identifying a first ordering of the fields of the data associated with an old request and/or data responsive to the old request (e.g., from historic data), (ii) identifying a second ordering of the fields of the data associated with a new request and/or data responsive to the new request, (iii) comparing the first ordering of the fields to the second ordering of the fields to obtain a difference in the ordering, and/or (iv) utilizing the difference in the ordering to determine the re-ordering of the fields.

Identifying the re-ordering of the fields may include identifying a change in a naming convention for one or more of the parameters associated with the data (a request and/or data responsive to the request). As such, identifying the re-ordering of the fields may also include: (i) identifying a first naming convention associated with an old request and/or data responsive to the old request (e.g., from historic data), (ii) identifying a second naming convention associated with a new request and/or data responsive to the new request, (iii) comparing the first naming convention to the second naming convention to obtain a difference in the naming convention, and/or (iv) utilizing the difference in the naming convention to determine the re-ordering of the fields.

Building the translation layer to update the data based on the re-ordering of the fields may include: (i) generating (and/or otherwise obtaining) instructions (e.g., as a package of code, etc.) for updating the data and/or (ii) implementing the instructions using the API. The instructions, when implemented, may cause: (i) implementing the schema for interpreting new data (e.g., requests and/or data responsive to the requests) so that data that utilizes the re-ordering of the fields will be transformed into data that utilizes the expected ordering of the fields to obtain the updated data pipeline, (ii) transmitting the schema for interpreting new data to another entity responsible for updating the data pipeline, and/or (iii) other methods.

Building the translation layer may also include transmitting the instructions to another entity responsible for building the translation layer and/or other methods without departing from embodiments disclosed herein.

Continuing the operation of the data pipeline using the translation layer may include: (i) feeding the data into the translation layer prior to processing the data and/or the request using the API, (ii) transmitting instructions to re-issue a request for the data to one or more downstream consumers and transforming the data (e.g., data obtained in response to the re-issued request and/or included in the re-issued request) using the translation layer, (iii) transmitting the data to another entity responsible for inputting the data into the data pipeline, and/or (iv) other methods.

The method may end following operation 310.

Figure 4A:
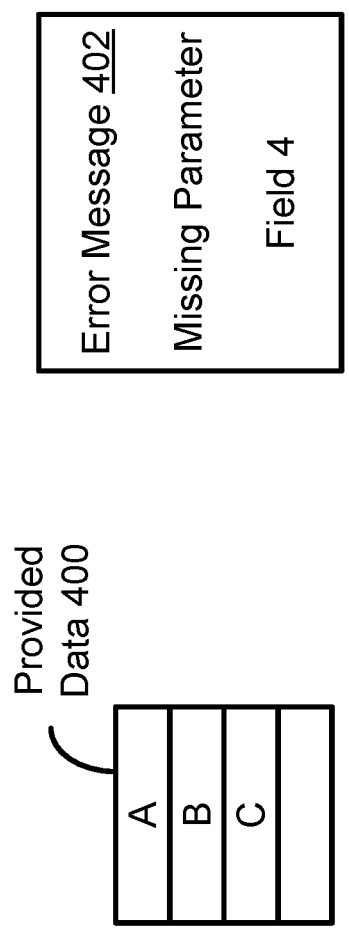
FIGS. 4A-4B show block diagrams illustrating a system in accordance with an embodiment over time.

Turning to FIG. 4A, consider a scenario in which one or more downstream consumers associated with a data pipeline issued a request to an API for data usable to provide computer-implemented services. The API may return provided data 400 to the one or more downstream consumers via the API. Provided data 400 may represent data included in the response from the API.

After providing provided data 400 to the one or more downstream consumers, error message 402 may be obtained. Error message 402 may be obtained in response to a misalignment of the data pipeline caused by an error associated with provided data 400. Error message 402 may indicate that the type of error may include a missing parameter and that the missing parameter may be located in the fourth field of the response.

Figure 4B:
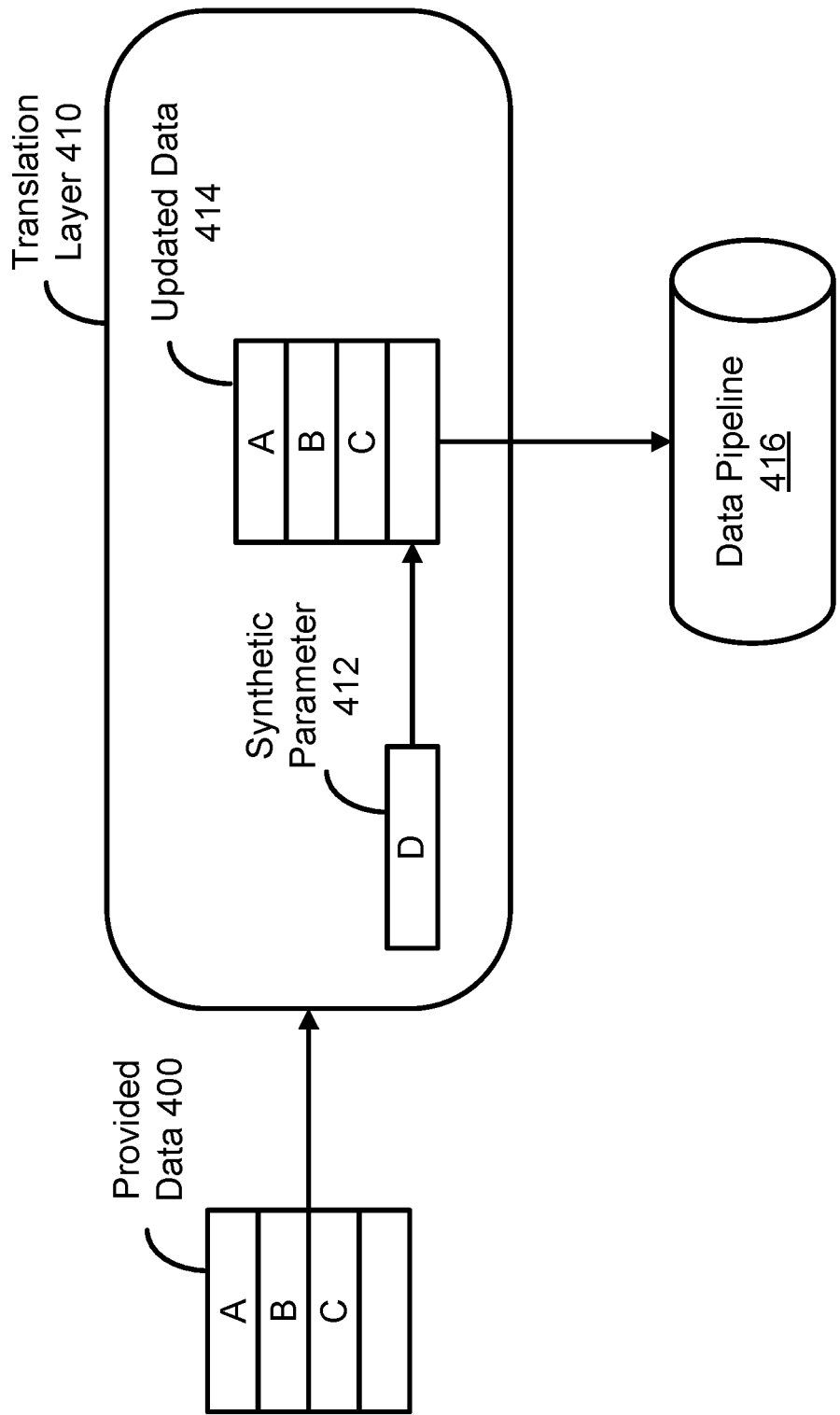

Turning to FIG. 4B, translation layer 410 may be generated and implemented to remediate the error associated with provided data 400. Translation layer 410 may be generated to supplement provided data 400 with synthetic parameter 412 to obtain updated data 414. Synthetic parameter 412 may include an inference generated, for example, by an inference model trained to predict missing parameters based on historic data for data pipeline 416. Operation of data pipeline 416 may continue using translation layer 410. However, translation layer 410 may be implemented only when requests for data are obtained from a particular downstream consumer. Otherwise, the functionality of the API used to process the requests may be unchanged and other translation layers may be implemented to remediate errors in requests and/or data provided in response to requests from other downstream consumers.

Figure 5:
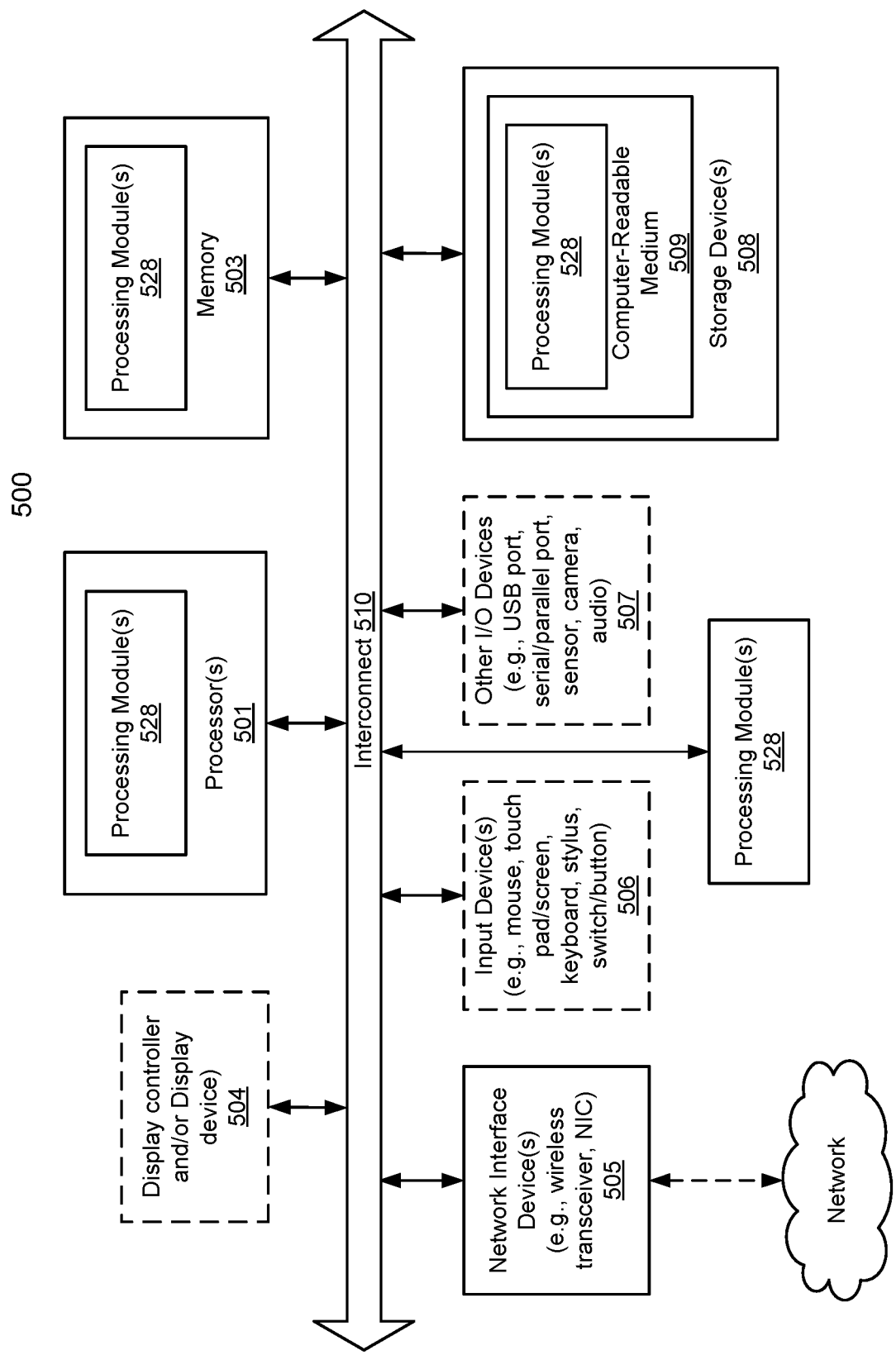
FIG. 5 shows a block diagram illustrating a data processing system in accordance with an embodiment.

Any of the components illustrated in FIGS. 1-4B may be implemented with one or more computing devices. Turning to FIG. 5, a block diagram illustrating an example of a data processing system (e.g., a computing device) in accordance with an embodiment is shown. For example, system 500 may represent any of data processing systems described above performing any of the processes or methods described above. System 500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 500 is intended to show a high level view of many components of the computer system. However, it is to be understood that additional components may be present in certain implementations and furthermore, different arrangement of the components shown may occur in other implementations. System 500 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 500 includes processor 501, memory 503, and devices 505-507 via a bus or an interconnect 510. Processor 501 may represent a single processor or multiple processors with a single processor core or multiple processor cores included therein. Processor 501 may represent one or more general-purpose processors such as a microprocessor, a central processing unit (CPU), or the like. More particularly, processor 501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 501, which may be a low power multi-core processor socket such as an ultra-low voltage processor, may act as a main processing unit and central hub for communication with the various components of the system. Such processor can be implemented as a system on chip (SoC). Processor 501 is configured to execute instructions for performing the operations discussed herein. System 500 may further include a graphics interface that communicates with optional graphics subsystem 504, which may include a display controller, a graphics processor, and/or a display device.

Processor 501 may communicate with memory 503, which in one embodiment can be implemented via multiple memory devices to provide for a given amount of system memory. Memory 503 may include one or more volatile storage (or memory) devices such as random access memory (RAM), dynamic RAM (DRAM), synchronous DRAM (SDRAM), static RAM (SRAM), or other types of storage devices. Memory 503 may store information including sequences of instructions that are executed by processor 501, or any other device. For example, executable code and/or data of a variety of operating systems, device drivers, firmware (e.g., input output basic system or BIOS), and/or applications can be loaded in memory 503 and executed by processor 501. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 500 may further include IO devices such as devices (e.g., 505, 506, 507, 508) including network interface device(s) 505, optional input device(s) 506, and other optional IO device(s) 507. Network interface device(s) 505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 506 may include a mouse, a touch pad, a touch sensitive screen (which may be integrated with a display device of optional graphics subsystem 504), a pointer device such as a stylus, and/or a keyboard (e.g., physical keyboard or a virtual keyboard displayed as part of a touch sensitive screen). For example, input device(s) 506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 507 may include an audio device. An audio device may include a speaker and/or a microphone to facilitate voice-enabled functions, such as voice recognition, voice replication, digital recording, and/or telephony functions. Other IO devices 507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 510 via a sensor hub (not shown), while other devices such as a keyboard or thermal sensor may be controlled by an embedded controller (not shown), dependent upon the specific configuration or design of system 500.

To provide for persistent storage of information such as data, applications, one or more operating systems and so forth, a mass storage (not shown) may also couple to processor 501. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 501, e.g., via a serial peripheral interface (SPI). This flash device may provide for non-volatile storage of system software, including a basic input/output software (BIOS) as well as other firmware of the system.

Storage device 508 may include computer-readable storage medium 509 (also known as a machine-readable storage medium or a computer-readable medium) on which is stored one or more sets of instructions or software (e.g., processing module, unit, and/or processing module/unit/logic 528) embodying any one or more of the methodologies or functions described herein. Processing module/unit/logic 528 may represent any of the components described above. Processing module/unit/logic 528 may also reside, completely or at least partially, within memory 503 and/or within processor 501 during execution thereof by system 500, memory 503 and processor 501 also constituting machine-accessible storage media. Processing module/unit/logic 528 may further be transmitted or received over a network via network interface device(s) 505.

Computer-readable storage medium 509 may also be used to store some software functionalities described above persistently. While computer-readable storage medium 509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 528, components and other features described herein can be implemented as discrete hardware components or integrated in the functionality of hardware components such as ASICS, FPGAs, DSPs or similar devices. In addition, processing module/unit/logic 528 can be implemented as firmware or functional circuitry within hardware devices. Further, processing module/unit/logic 528 can be implemented in any combination hardware devices and software components.

Note that while system 500 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method of managing a data pipeline, the method comprising:
    making a determination that a misalignment of the data pipeline has occurred with respect to a piece of data within the data pipeline;
    obtaining, in response to the determination, at least one error message selected from a list consisting of:
        a first error message generated by an application programming interface (API) following receipt by the API of a request for the piece of data from a downstream consumer; and
        a second error message obtained from the downstream consumer following an attempt by the API to provide the piece of data to the downstream consumer in response to receipt of the request by the API;
    obtaining an error classification for the piece of data using the at least one error message and the piece of data, the error classification indicating a type of error that occurred to the piece of data that caused the misalignment of the data pipeline;
    obtaining an action set for remediating the type of error; and
    performing the action set to remediate the misalignment by at least building an API translation layer that is inserted into the API to obtain an updated API, the updated API being caused to use the API translation layer to transform the piece of data with the type of error into corrected data and to insert the corrected data into the data pipeline.

2. The method of claim 1, wherein the first error message is generated in response to the API being unable to process the request for the piece of data.

3. The method of claim 1, wherein the second error message is generated by the downstream consumer in response to the downstream consumer being unable to use a response provided by the API, the response being generated by the API in response to the API processing the request for the piece of data.

4. The method of claim 1, wherein the error classification comprises at least one consisting selected from a list of error classifications consisting of:
    a first error classification indicating that the piece of data comprises at least one extra parameter;
    a second error classification indicating that the piece of data is missing at least one expected parameter;
    a third error classification indicating a change in a system of representation of information conveyed by the piece of data; and
    a fourth error classification indicating a re-ordering of fields of the piece of data.

5. The method of claim 4, wherein the API translation layer for the application programming interface is keyed to the downstream consumer to modify requests from the downstream consumer to the API prior to the API processing the requests, or to modify responses from the API to the downstream consumer prior to the downstream consumer receiving the responses from the API.

6. The method of claim 5, wherein performing the action set further comprises:
    in an instance where the error classification is the first error classification:
        prior to building the API translation layer, identifying the extra parameter;
        based on identifying the extra parameter, building the API translation layer to configure the API translational layer to discard the extra parameter from the data pipeline to obtain the corrected data; and
        continuing operation of the data pipeline by causing the API to use the API translation layer.

7. The method of claim 5, wherein performing the action set further comprises:
    in an instance where the error classification is the second error classification:
        prior to building the API translation layer, identifying the at least one parameter that is missing;
        based on identifying the at least one parameter that is missing, building the API translation layer to configure the API translational layer to:
            obtain a synthetic parameter using historic data to replace the at least one parameter that is missing; and
            add the synthetic parameter to the data pipeline to obtain the corrected data; and
        continuing operation of the data pipeline by causing the API to use the API translation layer.

8. The method of claim 5, wherein performing the action set further comprises:
    in an instance where the error classification is the third error classification:
        prior to building the API translation layer, identifying the changed system of representation of the information;

based on identifying the changed system of representation of the information, building the API translation layer to configure the API translational layer to obtain the corrected data by updating the data pipeline based on the changed system of representation of the information; and continuing operation of the data pipeline by causing the API to use the API translation layer.

9. The method of claim 5, wherein performing the action set further comprises:

in an instance where the error classification is the fourth error classification:

prior to building the API translation layer, identifying the re-ordering of the fields of the data;

based on identifying the re-ordering of the fields of the data, building the API translation layer to configure the API translational layer to update the data based on the re-ordering of the fields of the data to obtain the corrected data; and continuing operation of the data pipeline by causing the API to use the API translation layer.

10. A non-transitory machine-readable medium having instructions stored therein, which when executed by a processor, cause the processor to perform operations for managing a data pipeline, the operations comprising:

making a determination that a misalignment of the data pipeline has occurred with respect to a piece of data within the data pipeline;

obtaining, in response to the determination, at least one error message selected from a list consisting of:

a first error message generated by an application programming interface (API) following receipt by the API of a request for the piece of data from a downstream consumer; and a second error message obtained from the downstream consumer following an attempt by the API to provide the piece of data to the downstream consumer in response to receipt of the request by the API;

obtaining an error classification for the piece of data using the at least one error message and the piece of data, the error classification indicating a type of error that occurred to the piece of data that caused the misalignment of the data pipeline;

obtaining an action set for remediating the type of error; and performing the action set to remediate the misalignment by at least building an API translation layer that is inserted into the API to obtain an updated API, the updated API being caused to use the API translation layer to transform the piece of data with the type of error into corrected data and to insert the corrected data into the data pipeline.

11. The non-transitory machine-readable medium of claim 10, wherein the first error message is generated in response to the API being unable to process the request for the piece of data.

12. The non-transitory machine-readable medium of claim 10, wherein the second error message is generated by the downstream consumer in response to the downstream consumer being unable to use a response provided by the API, the response being generated by the API in response to the API processing the request for the piece of data.

13. The non-transitory machine-readable medium of claim 10, wherein the error classification comprises at least one consisting selected from a list of error classifications consisting of:

a first error classification indicating that the piece of data comprises at least one extra parameter;

a second error classification indicating that the piece of data is missing at least one expected parameter;

a third error classification indicating a change in a system of representation of information conveyed by the piece of data; and a fourth error classification indicating a re-ordering of fields of the piece of data.

14. A data processing system, comprising:

a processor; and a memory coupled to the processor to store instructions, which when executed by the processor, cause the processor to perform operations for managing a data pipeline, the operations comprising:

making a determination that a misalignment of the data pipeline has occurred with respect to a piece of data within the data pipeline;

obtaining, in response to the determination, at least one error message selected from a list consisting of:

a first error message generated by an application programming interface (API) following receipt by the API of a request for the piece of data from a downstream consumer; and a second error message obtained from the downstream consumer following an attempt by the API to provide the piece of data to the downstream consumer in response to receipt of the request by the API;

obtaining an error classification for the piece of data using the at least one error message and the piece of data, the error classification indicating a type of error that occurred to the piece of data that caused the misalignment of the data pipeline;

obtaining an action set for remediating the type of error; and performing the action set to remediate the misalignment by at least building an API translation layer that is inserted into the API to obtain an updated API, the updated API being caused to use the API translation layer to transform the piece of data with the type of error into corrected data and to insert the corrected data into the data pipeline.

15. The data processing system of claim 14, wherein the first error message is generated in response to the API being unable to process the request for the piece of data.

16. The data processing system of claim 14, wherein the second error message is generated by the downstream consumer in response to the downstream consumer being unable to use a response provided by the API, the response being generated by the API in response to the API processing the request for the piece of data.

17. The data processing system of claim 14, wherein the error classification comprises at least one consisting selected from a list of error classifications consisting of:

a first error classification indicating that the piece of data comprises at least one extra parameter;

a second error classification indicating that the piece of data is missing at least one expected parameter;

a third error classification indicating a change in a system of representation of information conveyed by the piece of data; and a fourth error classification indicating a re-ordering of fields of the piece of data.

18. The non-transitory machine-readable medium of claim 13, wherein the API translation layer for the application programming interface is keyed to the downstream consumer to modify requests from the downstream consumer to the API prior to the API processing the requests, or to modify responses from the API to the downstream consumer prior to the downstream consumer receiving the responses from the API.

19. The non-transitory machine-readable medium of claim 18, wherein performing the action set further comprises:
   in an instance where the error classification is the first error classification:
      prior to building the API translation layer, identifying the extra parameter;
      based on identifying the extra parameter, building the API translation layer to configure the API translational layer to discard the extra parameter from the data pipeline to obtain the corrected data; and
      continuing operation of the data pipeline by causing the API to use the API translation layer.

20. The data processing system of claim 17, wherein the API translation layer for the application programming interface is keyed to the downstream consumer to modify requests from the downstream consumer to the API prior to the API processing the requests, or to modify responses from the API to the downstream consumer prior to the downstream consumer receiving the responses from the API.

* * * * *